United States Patent
Shinozaki et al.

(10) Patent No.: US 10,933,851 B2
(45) Date of Patent: Mar. 2, 2021

(54) BRAKE CONTROL APPARATUS

(71) Applicants: ADVICS CO., LTD., Kariya (JP); TOYOTA JIDOSHA KABUSHIKI KAISHA, Toyota (JP)

(72) Inventors: Jun Shinozaki, Obu (JP); Koichi Kokubo, Nagoya (JP); Masayuki Naito, Nagakute (JP); Yuji Yoshii, Mishima (JP); Masahiro Hara, Gotemba (JP)

(73) Assignees: ADVICS CO., LTD., Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 233 days.

(21) Appl. No.: 16/133,806

(22) Filed: Sep. 18, 2018

(65) Prior Publication Data
US 2019/0084539 A1    Mar. 21, 2019

(30) Foreign Application Priority Data

Sep. 19, 2017    (JP) .............................. JP2017-178970

(51) Int. Cl.
| | |
|---|---|
| *B60T 8/17* | (2006.01) |
| *B60T 8/42* | (2006.01) |
| *B60T 8/36* | (2006.01) |
| *B60T 8/40* | (2006.01) |
| *B60T 8/48* | (2006.01) |
| *B60T 8/34* | (2006.01) |

(Continued)

(52) U.S. Cl.
CPC ................ *B60T 8/42* (2013.01); *B60T 8/341* (2013.01); *B60T 8/36* (2013.01); *B60T 8/404* (2013.01); *B60T 8/445* (2013.01); *B60T 8/4872* (2013.01); *B60T 13/68* (2013.01)

(58) Field of Classification Search
CPC .......... B60T 8/17; B60T 8/1761; B60T 8/176; B60T 8/34; B60T 8/404; B60T 8/4045; B60T 8/50; B60T 8/42
USPC .................................................. 303/157, 159
See application file for complete search history.

(56) References Cited

U.S. PATENT DOCUMENTS

| | | | | |
|---|---|---|---|---|
| 4,886,322 A | * | 12/1989 | Atkins | ................ B60T 8/17616 |
| | | | | 303/149 |
| 5,281,009 A | * | 1/1994 | Kidston | ................ B60T 8/4266 |
| | | | | 303/156 |

(Continued)

FOREIGN PATENT DOCUMENTS

| | | | |
|---|---|---|---|
| JP | 10016749 A | * | 1/1998 |
| JP | 2949741 | | 9/1999 |

*Primary Examiner* — Bradley T King
*Assistant Examiner* — Stephen M Bowes
(74) *Attorney, Agent, or Firm* — Oblon, McClelland, Maier & Neustadt, L.L.P.

(57) ABSTRACT

According to one embodiment, for example, when it is determined that a certain condition has been satisfied while first antilock control is being executed, a controller of a brake control apparatus executes second antilock control by opening and closing a solenoid valve with a motor stopped so that brake fluid of the wheel cylinder is caused to flow into a reservoir, the second antilock control including a second pressure reduction mode, the second pressure reduction mode reducing a pressure of a wheel cylinder while substantially equilibrating the pressure of the wheel cylinder and a pressure of the reservoir at a certain pressure or larger, the certain pressure being larger than zero.

6 Claims, 7 Drawing Sheets

(51) Int. Cl.
    *B60T 8/44*    (2006.01)
    *B60T 13/68*   (2006.01)

(56) References Cited

U.S. PATENT DOCUMENTS

| | | | | |
|---|---|---|---|---|
| 5,522,650 A | * | 6/1996 | Negrin | B60T 8/404 |
| | | | | 303/10 |
| 5,605,384 A | * | 2/1997 | Johnston | B60T 8/34 |
| | | | | 188/352 |

* cited by examiner

BRAKE CONTROL APPARATUS

CROSS-REFERENCE TO RELATED APPLICATIONS

This application is based upon and claims the benefit of priority from Japanese Patent Application No. 2017-178970, filed Sep. 19, 2017, the entire contents of which are incorporated herein by reference.

FIELD

Embodiments described herein relate to a brake control apparatus.

BACKGROUND

Conventionally, there has been known antilock control that reduces, holds, and increases the pressure of a wheel cylinder in an appropriately switched manner to inhibit the lock (the discrepancy between a wheel speed and an actual vehicle speed; slip) of wheels during sudden braking, during braking on a road surface having relatively low surface resistance, or the like. An example of related art is described in Japanese Patent No. 2949741.

SUMMARY

In the conventional antilock control as described above, when a phenomenon in which a drop of the wheel speed continues for a long period of time (e.g. a hydroplaning phenomenon) occurs, the reduction of the pressure of the wheel cylinder is performed for a long period of time, whereby the pressure of the wheel cylinder may become zero.

However, the wheel cylinder is generally configured such that, when its pressure becomes zero, its pressure does not instantly increase until a certain amount of brake fluid flows thereinto. In other words, the wheel cylinder is configured such that, when its pressure becomes zero, the responsiveness of a pressure increase degrades until a certain amount of brake fluid what is called an unproductive fluid amount corresponding to the specification of the wheel cylinder flows thereinto.

Consequently, in the conventional antilock control as described above, when the pressure of the wheel cylinder becomes zero by a long-period pressure reduction, in a stage in which pressure increase is performed after the pressure reduction, responsiveness degrades by an extent corresponding to the time during which the unproductive fluid amount is caused to flow thereinto.

Given these circumstances, one of objects of embodiments is to provide a brake control apparatus that can inhibit the responsiveness of the pressure increase after a long-period pressure reduction from degrading during execution of the antilock control.

According to one embodiment, for example, a brake control apparatus includes: a controller configured to control a solenoid valve and a motor, the solenoid valve regulating a pressure of a wheel cylinder given by brake fluid, the motor driving a pump pumping up the brake fluid from the wheel cylinder to a master cylinder via a reservoir, the controller being configured to perform a first pressure reduction mode, a first pressure hold mode and a first pressure increase mode in a switched manner by opening and closing the solenoid valve with the motor operated so that first antilock control for inhibiting lock of a wheel during vehicle braking is executed, the first pressure reduction mode reducing the pressure of the wheel cylinder, the first pressure hold mode holding the pressure of the wheel cylinder, the first pressure increase mode increasing the pressure of the wheel cylinder; and a determinator configured to determine whether a certain condition has been satisfied while the first antilock control is being executed, wherein when it is determined that the certain condition has been satisfied while the first antilock control is being executed, the controller executes second antilock control by opening and closing the solenoid valve with the motor stopped so that the brake fluid of the wheel cylinder is caused to flow into the reservoir, the second antilock control including a second pressure reduction mode, the second pressure reduction mode reducing the pressure of the wheel cylinder while substantially equilibrating the pressure of the wheel cylinder and a pressure of the reservoir at a certain pressure or larger, the certain pressure being larger than zero. With this configuration, the shift from the first antilock control to the second antilock control is performed under the certain condition. Consequently, even when the reduction of the pressure of the wheel cylinder is performed for a long period of time, the pressure of the wheel cylinder does not become zero and is the certain pressure or larger, the certain pressure being larger than zero. Thus, the responsiveness of a pressure increase after a long-period pressure reduction can be inhibited from degrading during execution of the antilock control.

According to one embodiment of the brake control apparatus, for example, the second antilock control performs a second pressure hold mode, a second pressure increase mode, and the second pressure reduction mode in a switched manner, the second pressure hold mode holding the pressure of the wheel cylinder while pumping up the brake fluid from the reservoir with the pump by closing a first solenoid valve serving as the solenoid valve provided between the wheel cylinder and the reservoir and closing a second solenoid valve serving as the solenoid valve provided between the master cylinder and the wheel cylinder with the motor operated, the second pressure increase mode increasing the pressure of the wheel cylinder while causing the brake fluid to flow into the wheel cylinder by closing the first solenoid valve and opening the second solenoid valve with the motor stopped, the second pressure reduction mode reducing the pressure of the wheel cylinder while substantially equilibrating the pressure of the wheel cylinder and the pressure of the reservoir at the certain pressure or larger by opening the first solenoid valve and closing the second solenoid valve with the motor stopped. With this configuration, by performing appropriate switch between the second pressure hold mode, the second pressure increase mode, and the second pressure reduction mode, the lock of the wheel can be inhibited while maintaining the pressure of the wheel cylinder at least at the certain pressure or larger.

According to one embodiment of the brake control apparatus, for example, the second antilock control repeats a cycle including performing the second pressure hold mode when shifted from the first antilock control, shifting to the second pressure increase mode when the reservoir has substantially been emptied in the second pressure hold mode, shifting to the second pressure reduction mode when the second pressure increase mode has been performed for a certain time, and returning to the second pressure hold mode when the pressure of the wheel cylinder and the pressure of the reservoir have substantially equilibrated at the certain pressure or larger in the second pressure reduction mode. With this configuration, the second pressure hold mode, the second pressure increase mode, and the second pressure reduction mode can be switched at appropriate timing.

According to one embodiment of the brake apparatus, for example, the certain condition is that the pressure of the wheel cylinder becomes a first threshold or less while the first antilock control is being executed. With this configuration, by monitoring the pressure of the wheel cylinder, the shift from the first antilock control to the second antilock control can be performed at appropriate timing before the pressure of the wheel cylinder becomes zero.

According to one embodiment of the brake control apparatus, for example, the certain condition is that a duration of the first pressure hold mode or the first pressure reduction mode becomes a second threshold or more. With this configuration, determination of whether the reduction of the pressure of the wheel cylinder has been performed for a long period of time can be performed on the basis of the duration of the first pressure hold mode or the first pressure reduction mode, and the shift from the first antilock control to the second antilock control can be performed at appropriate timing based on a result of the determination.

According to one embodiment of the brake control apparatus, for example, the certain pressure is a pressure corresponding to an unproductive fluid amount, which is a fluid amount by which the pressure of the wheel cylinder does not substantially increase. With this configuration, a state in which at least the unproductive fluid amount is ensured in the wheel cylinder can be maintained while the second antilock control is being executed.

DETAILED DESCRIPTION

The following describes one embodiment of the present invention on the basis of the accompanying drawings. The configuration of the following embodiment, and actions and results (effects) brought about by the configuration are by way of example only, and the following descriptions are not limiting.

Figure 1:
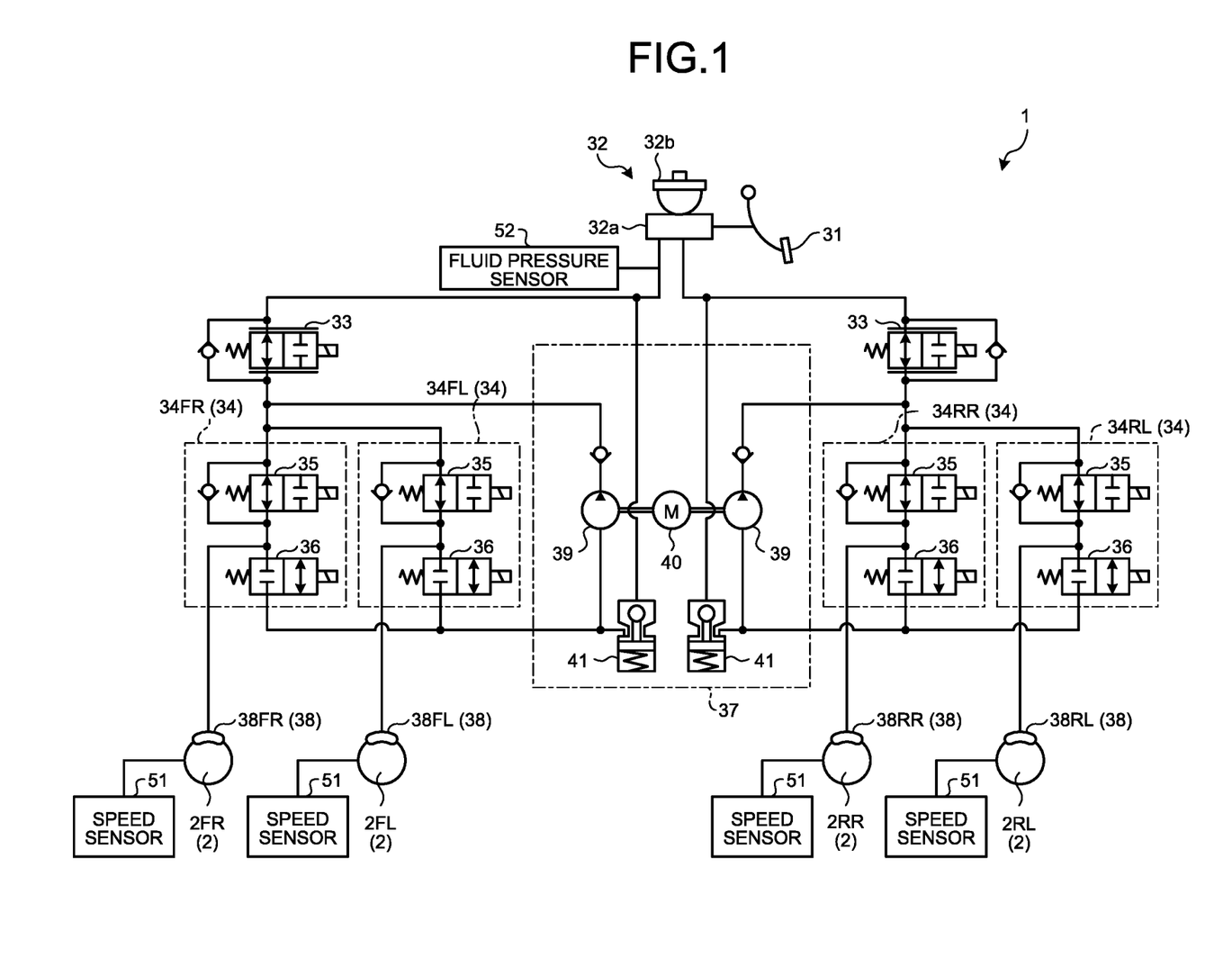
FIG. 1 is an exemplary configuration diagram illustrating a schematic configuration of a brake apparatus to be controlled by a brake control apparatus according to one embodiment.

FIG. 1 is an exemplary configuration diagram illustrating a schematic configuration of a brake apparatus to be controlled by a brake control apparatus 200 (not illustrated in FIG. 1 and refer to FIG. 2 described below) according to one embodiment. This brake apparatus is provided in four-wheel vehicles, for example. The technology of the embodiment can also be applied to general vehicles other than four-wheel vehicles.

As exemplified in FIG. 1, the brake apparatus according to the embodiment has a fluid pressure brake mechanism 1 capable of applying a braking force (frictional braking torque) to each of front wheels 2FL and 2FR and rear wheels 2RL and 2RR.

The fluid pressure brake mechanism 1 includes: a pressure generator 32; wheel cylinders 38FL, 38FR, 38RL, and 38RR; and pressure regulators 34FL, 34FR, 34RL, and 34RR, and a returning mechanism 37.

In the following, for the sake of simplicity, the wheels 2FL, 2FR, 2RL, and 2RR may be collectively referred to as a wheel 2, the wheel cylinders 38FL, 38FR, 38RL, and 38RR may be collectively referred to as a wheel cylinder 38, and the pressure regulators 34FL, 34FR, 34RL, and 34RR may be collectively referred to as a pressure regulator 34.

The pressure generator 32 is a mechanism generating pressure (fluid pressure) corresponding to an operation on a brake pedal 31 by a driver of a vehicle. The wheel cylinders 38FL, 38FR, 38RL, and 38RR are mechanisms applying braking forces to the wheels 2FL, 2FR, 2RL, and 2RR, respectively, by pressurizing respective friction braking members.

The pressure regulators 34FL, 34FR, 34RL, and 34RR are mechanisms regulating fluid pressures to be applied to the wheel cylinders 38FL, 38FR, 38RL, and 38RR, respectively. The returning mechanism 37 is a mechanism returning brake fluid (working fluid) as a medium for generating fluid pressure to the upstream side, that is, from the wheel cylinder 38 toward the pressure generator 32.

The pressure generator 32 has a master cylinder 32a and a reservoir tank 32b. The master cylinder 32a discharges the brake fluid refilled from the reservoir tank 32b to two discharge ports on the basis of pressure generated in accordance with an operation (pressing-down operation) on the brake pedal 31 by the driver.

The two discharge ports of the master cylinder 32a are each connected to the pressure regulator 34 on the front side (34FR and 34FL) and the pressure regulator 34 on the rear side (34RR and 34RL) via respective solenoid valves 33 electrically switching between an open state and a closed state. The solenoid valves 33 open and close on the basis of an electric signal given from the brake control apparatus 200 (refer to FIG. 2) or the like.

The pressure regulator 34 has solenoid valves 35 and 36 electrically switching between an open state and a closed state. The solenoid valves 35 and 36 are provided between the solenoid valve 33 and a reservoir 41 of the returning mechanism 37. The solenoid valve 35 is provided on the solenoid valve 33 side, whereas the solenoid valve 36 is provided on the reservoir 41 side. The solenoid valve 36 is an example of a "first solenoid valve," whereas the solenoid valve 35 is an example of a "second solenoid valve."

The wheel cylinder 38 is connected to between the solenoid valves 35 and 36. With this configuration, the solenoid valves 35 and 36 open and close on the basis of an electric signal given from the brake control apparatus 200 (refer to FIG. 2) or the like and can thereby increase, hold, or reduce the fluid pressure of the wheel cylinder 38.

More specifically, the solenoid valve 35 is what is called a normally open (NO) valve, which is set to the open state during normal times. Consequently, the solenoid valve 35 in an off state (during normal times), in which no electric signal has been received, functions as a pressure increasing valve capable of causing the brake fluid to flow into the wheel cylinder 38 and increasing the fluid pressure of the wheel cylinder 38, whereas the solenoid valve 35 in an on state (during operation), in which an electric signal has been received, functions as a holding valve capable of blocking the flowing of the brake fluid into the wheel cylinder 38 and holding the fluid pressure of the wheel cylinder 38.

On the other hand, the solenoid valve 36 is what is called a normally closed (NC) valve, which is set to the closed state during normal times. Consequently, the solenoid valve 36 in an off state (during normal times), in which no electric signal has been received, functions as a holding valve capable of blocking the flowing of the brake fluid out of the wheel cylinder 38 and holding the fluid pressure of the wheel cylinder 38, whereas the solenoid valve 36 in an on state (during operation), in which an electric signal has been received, functions as a pressure reducing valve capable of causing the brake fluid to flow out of the wheel cylinder 38 and reducing the fluid pressure of the wheel cylinder 38.

The returning mechanism 37 has the reservoir 41, a pump 39, and a pump motor 40. The reservoir 41 temporarily stores therein brake fluid flowing out of the wheel cylinder 38. The pump 39 is driven by the pump motor 40 to pump up the brake fluid from the wheel cylinder 38 to the master cylinder 32a. In the example in FIG. 1, one reservoir 41 and one pump 39 are provided for each of the side pressure regulators 34 on the front side (34FR and 34FL) and the pressure regulators 34 on the rear side (34RR and 34RL).

The fluid pressure brake mechanism 1 is provided with a speed sensor 51, a fluid pressure sensor 52, and an acceleration sensor 53 (not illustrated in FIG. 1) as sensors detecting various kinds of state quantities of the vehicle. The speed sensor 51 is a sensor detecting the rotational speed (the number of revolutions) of the wheel 2. The fluid pressure sensor 52 is a sensor detecting pressure occurring in the master cylinder 32a. The acceleration sensor 53 is a sensor detecting acceleration (deceleration) acting on the vehicle.

The output value of the speed sensor 51 can be used for the calculation of a vehicle speed (the speed of the vehicle). The output value of the fluid pressure sensor 52 can be used for the estimation of the fluid pressure of the wheel cylinder 38. The output value of the acceleration sensor 53 can be used for the calculation of the gradient of a road surface on which the vehicle is positioned and the like.

Figure 2:
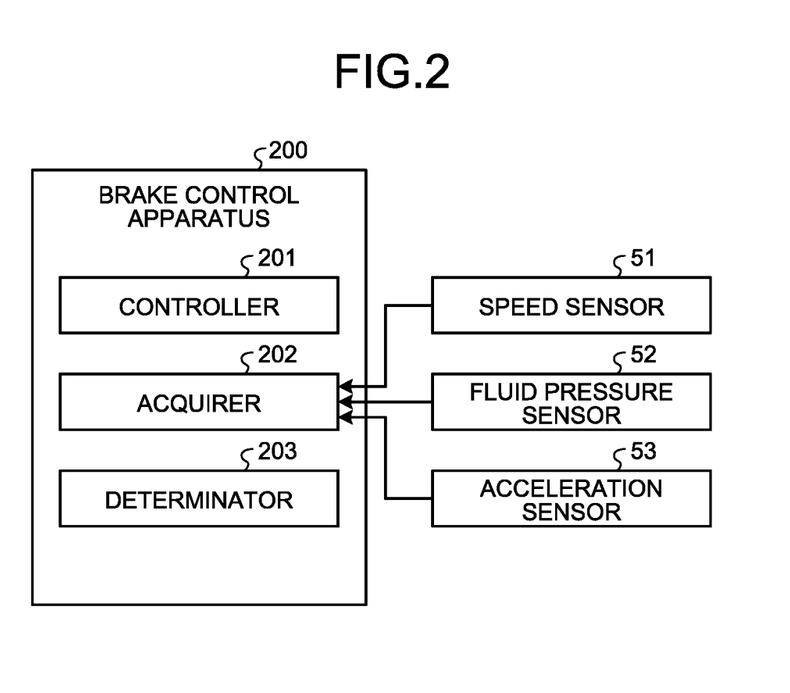
FIG. 2 is an exemplary block diagram illustrating functions of the brake control apparatus according to the embodiment.

The fluid pressure brake mechanism 1 according to the embodiment is configured to achieve antilock control on the basis of the control of the brake control apparatus 200 (refer to FIG. 2). The antilock control is control for inhibiting the lock (the discrepancy between a wheel speed and an actual vehicle speed, slip) of the wheel 2 that can occur during sudden braking, during braking on a road surface having relatively low surface resistance, or the like. The antilock control is conventionally generally known.

The conventional antilock control employs a technique that reduces the discrepancy between the wheel speed and the actual vehicle speed by operates the pump motor 40 at all times, controlling the solenoid valves 35 and 36 so as to intermittently return the brake fluid from the wheel cylinder 38 to the master cylinder 32a, and appropriately switching between reduce, hold, and increase of the pressure of the wheel cylinder 38.

In the conventional antilock control as described above, when a phenomenon in which a drop of the wheel speed continues for a long period of time such as a hydroplaning phenomenon occurs, the reduction of the pressure of the wheel cylinder 38 is performed for a long period of time, whereby the pressure of the wheel cylinder 38 may become zero.

However, the wheel cylinder 38 is generally configured such that, when its pressure becomes zero, its pressure does not instantly increase until a certain amount of brake fluid flows thereinto. In other words, the wheel cylinder 38 is configured such that, when its pressure becomes zero, the responsiveness of a pressure increase degrades until a certain amount of brake fluid what is called an unproductive fluid amount corresponding to the specification of the wheel cylinder 38 flows thereinto.

Consequently, in the conventional antilock control as described above, when the pressure of the wheel cylinder 38 becomes zero by a long-period pressure reduction, in a stage in which pressure increase is performed after the pressure reduction, responsiveness degrades by an extent corresponding to the necessity for the time during which the brake fluid corresponding to the unproductive fluid amount is caused to flow into the wheel cylinder 38.

Given these circumstance, the embodiment implements the brake control apparatus 200 having functions described below in a brake electronic control unit (ECU) including computer hardware such as a processor and a memory, so that the responsiveness of the pressure increase after a long-period pressure reduction is inhibited from degrading during execution of the antilock control.

FIG. 2 is an exemplary block diagram illustrating functions of the brake control apparatus 200 according to the embodiment. The functions illustrated in FIG. 2 are implemented by causing the processor of the brake ECU to execute a computer program stored in the memory, for example. In the embodiment, part or the whole of the functions illustrated in FIG. 2 may be implemented by exclusive hardware (circuitry).

As illustrated in FIG. 2, the brake control apparatus 200 includes a controller 201, an acquirer 202, and a determinator 203.

The controller 201 controls the fluid pressure brake mechanism 1 illustrated in FIG. 1. The acquirer 202 acquires the output values (sensor information) of various kinds of sensors such as the speed sensor 51, the fluid pressure sensor 52, and the acceleration sensor 53. The determinator 203 determines whether various kinds of conditions related to the control executed by the controller 201 have been satisfied on the basis of the sensor information acquired by the acquirer 202.

In the embodiment, the controller 201 is configured to be capable of executing two kinds of antilock control as the antilock control. More specifically, the controller 201 is configured to be capable of executing first antilock control inhibiting the lock of the wheel 2 in a manner substantially similar to the conventional technique and second antilock control inhibiting the lock of the wheel 2 in a manner different from the first antilock control, during vehicle braking.

The first antilock control is executed when the discrepancy between the wheel speed and the actual vehicle speed exceeds a certain threshold, similarly to the conventional technique. This first antilock control is control that perform a first pressure reduction mode reducing the pressure of the wheel cylinder 38, a first pressure hold mode holding the pressure of the wheel cylinder 38, and a first pressure increase mode increasing the pressure of the wheel cylinder 38 in a switched manner by appropriately opening and closing the solenoid valves 35 and 36 while operating the pump motor 40 at all times.

On the other hand, the second antilock control is executed when it is determined that a certain condition has been satisfied while the first antilock control is being executed. The certain condition corresponds to the occurrence of a situation in which a long-period pressure reduction is performed in the first antilock control. More specifically, the certain condition is that the pressure of the wheel cylinder 38 becomes a first threshold or less while the first antilock control is being executed. The first threshold is a pressure corresponding to the unproductive fluid amount as described above, for example. In the embodiment, the certain condition may be that the duration of the first pressure hold mode or the first pressure reduction mode becomes a second threshold or more.

The second antilock control is also control that performs a second pressure reduction mode reducing the pressure of the wheel cylinder 38, a second pressure hold mode holding the pressure of the wheel cylinder 38, and a second pressure increase mode increasing the pressure of the wheel cylinder 38 in a switched manner, similarly to the first antilock control. However, the second antilock control is different from the first antilock control in that the pump motor 40 is operated not at all times. The following describes mode shifts in the second antilock control more specifically.

Figure 3:
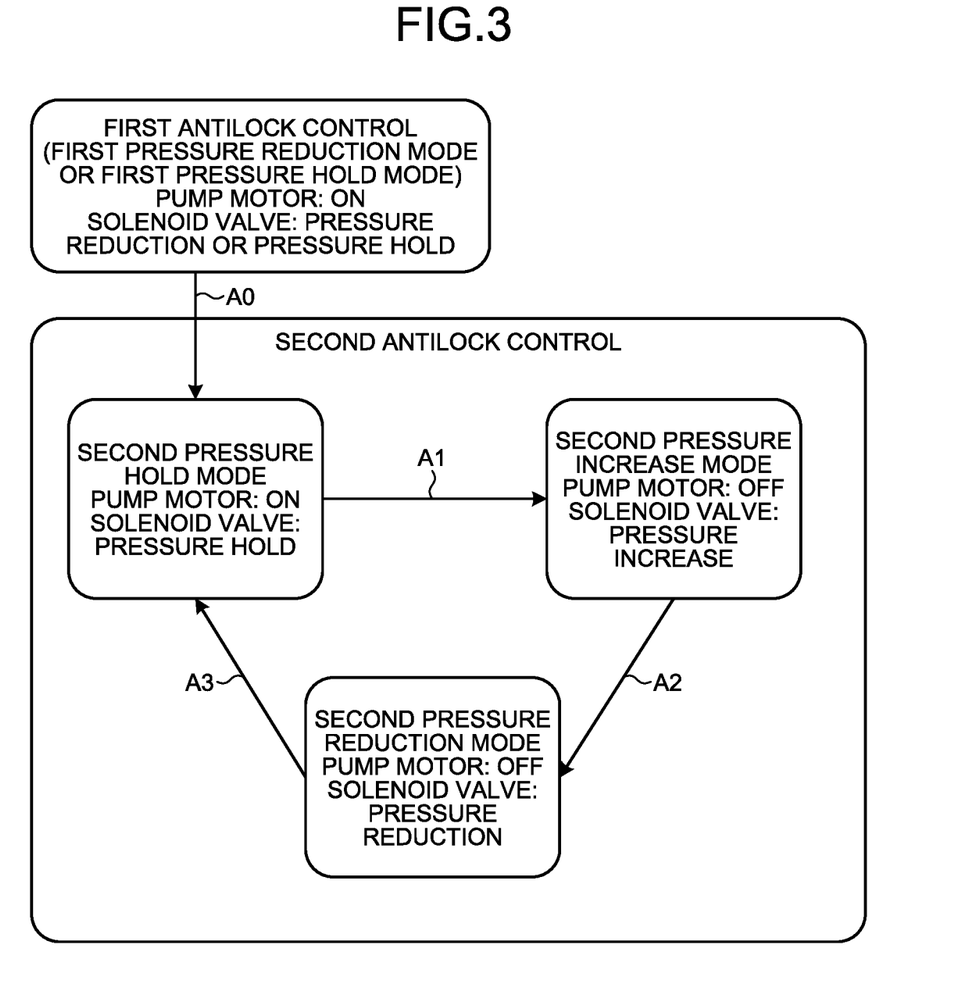
FIG. 3 is an exemplary block diagram illustrating mode shifts in second antilock control executed by the brake control apparatus according to the embodiment.

FIG. 3 is an exemplary block diagram illustrating mode shifts in the second antilock control executed by the brake control apparatus 200 according to the embodiment. As illustrated in FIG. 3, the second antilock control is executed by shifting from the first pressure reduction mode or the first pressure hold mode of the first antilock control.

When the second antilock control is executed by shifting from the first antilock control, the second pressure hold mode is first performed (refer to the arrow A0). The second pressure hold mode is a mode of holding the pressure of the wheel cylinder 38 while pumping up the brake fluid from the reservoir 41 with the pump 39 by closing the solenoid valve 36 provided between the wheel cylinder 38 and the reservoir 41 and closing the solenoid valve 35 provided between the master cylinder 32a and the wheel cylinder 38 (on the side opposite the solenoid valve 36 relative to the wheel cylinder 38) with the pump motor 40 operated.

The second pressure hold mode gradually reduces the fluid amount within the reservoir 41. When the reservoir 41 is substantially emptied, the second pressure hold mode shifts to the second pressure increase mode (refer to the arrow A1). The second pressure increase mode is a mode of gradually increasing the pressure of the wheel cylinder 38 while causing the brake fluid to flow into the wheel cylinder 38 by closing the solenoid valve 36 provided between the wheel cylinder 38 and the reservoir 41 and opening the solenoid valve 35 provided between the master cylinder 32a and the wheel cylinder 38 (on the side opposite the solenoid valve 36 relative to the wheel cylinder 38) with the pump motor 40 stopped.

The second pressure increase mode is performed in order to increase the pressure of the wheel cylinder 38 by an amount determined in advance. Consequently, when the second pressure increase mode is performed for a certain time, the second pressure increase mode shifts to the second pressure reduction mode (refer to the arrow A2). The second pressure reduction mode is a mode of gradually reducing the pressure of the wheel cylinder 38 while substantially equilibrating the pressure of the wheel cylinder 38 and the pressure of the reservoir 41 at a certain pressure, which is larger than zero, or larger by opening the solenoid valve 36 provided between the wheel cylinder 38 and the reservoir 41 and closing the solenoid valve 35 provided between the master cylinder 32a and the wheel cylinder 38 (on the side opposite the solenoid valve 36 relative to the wheel cylinder 38) with the pump motor 40 stopped.

The second pressure reduction mode is performed until the pressure of the wheel cylinder 38 and the pressure of the reservoir 41 substantially equilibrate at the certain pressure or larger, the certain pressure being larger than zero. Consequently, when the pressure of the wheel cylinder 38 and the pressure of the reservoir 41 have substantially equilibrated by the second pressure reduction mode, the second pressure reduction mode shifts to the second pressure hold mode (refer to the arrow A3). Thus, in the second antilock control, the second pressure hold mode, the second pressure increase mode, and the second pressure reduction mode are repeatedly performed in this order.

In the embodiment, the certain pressure at which the pressure of the wheel cylinder 38 and the pressure of the reservoir 41 substantially equilibrate is set so as to correspond to the unproductive fluid amount, which is a fluid amount by which the pressure of the wheel cylinder 38 does not substantially increase. Consequently, in the embodiment, while the second antilock control is being executed, even when the pressure reduction by the second pressure reduction mode is performed, at least the unproductive fluid amount is ensured in the wheel cylinder 38. Therefore, in the embodiment, when a pressure increase by the subsequent first pressure increase mode is performed, for example, the pressure of the wheel cylinder 38 increases quickly with good responsiveness.

In the embodiment, the pressure at which the pressure of the wheel cylinder 38 and the pressure of the reservoir 41 substantially equilibrate corresponds to a point at which a pressure determined from the specification (brake fluid volume to wheel cylinder internal pressure characteristics) of the wheel cylinder 38 and a pressure determined from the specification (brake fluid volume to reservoir internal pressure characteristics) of the reservoir 41 substantially equilibrate. The characteristics of brake fluid volume to reservoir internal pressure can be changed by adjusting the spring constant of springs provided in the reservoir 41. Consequently, in the embodiment, the pressure at which the pressure of the wheel cylinder 38 and the pressure of the reservoir 41 substantially equilibrate can be adjusted by adjusting the spring constant of the reservoir 41.

The following describes procedures executed in the embodiment.

Figure 4:
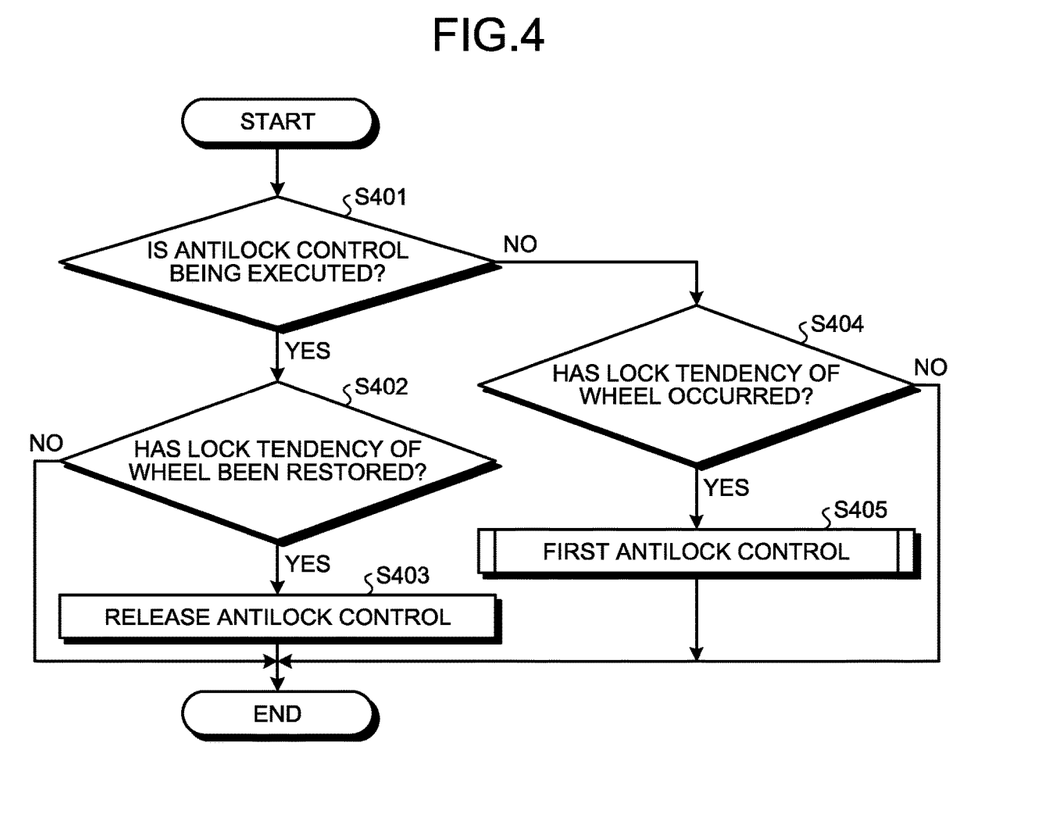
FIG. 4 is an exemplary flowchart illustrating a procedure executed by the brake control apparatus during vehicle braking, according to the embodiment.

FIG. 4 is an exemplary flowchart illustrating a procedure executed by the brake control apparatus 200 during vehicle braking, according to the embodiment. This procedure illustrated in FIG. 4 is repeatedly executed during vehicle braking.

In the procedure illustrated in FIG. 4, first, at S401, the brake control apparatus 200 determines whether the antilock control (the first antilock control or the second antilock control) is being executed.

If it is determined that the antilock control is being executed at S401, the process advances to S402. At S402, the brake control apparatus 200 determines whether the lock (lock tendency) of the wheel 2 has been restored. This determination process at S402 is performed on the basis of the output values of the various kinds of sensors acquired by the acquirer 202.

If it is determined that the lock of the wheel 2 has been restored at S402, the process advances to S403. At S403, the brake control apparatus 200 releases the antilock control that is being executed. The process then ends.

If it is determined that the lock of the wheel 2 has not been restored at S402, the antilock control that is being executed is not released, and the process then ends.

In contrast, if it is determined that the antilock control is not being executed at S401, the process advances to S404. At S404, the brake control apparatus 200 determines whether the lock tendency of the wheel 2 has occurred, or more specifically, whether the discrepancy between the wheel speed and the actual vehicle speed has exceeded a threshold by a drop of the wheel speed. This determination process at S404 is also performed on the basis of the output values of the various kinds of sensors acquired by the acquirer 202 similarly to the determination process at S402 described above.

If it is determined that the lock tendency of the wheel 2 has not occurred at S404, there is no need to inhibit the lock of the wheel 2, whereby the process then ends. However, if it is determined that the lock tendency of the wheel 2 has occurred at S404, the process advances to S405.

At S405, the brake control apparatus 200 executes the first antilock control including a procedure described below. The process then ends.

Figure 5:
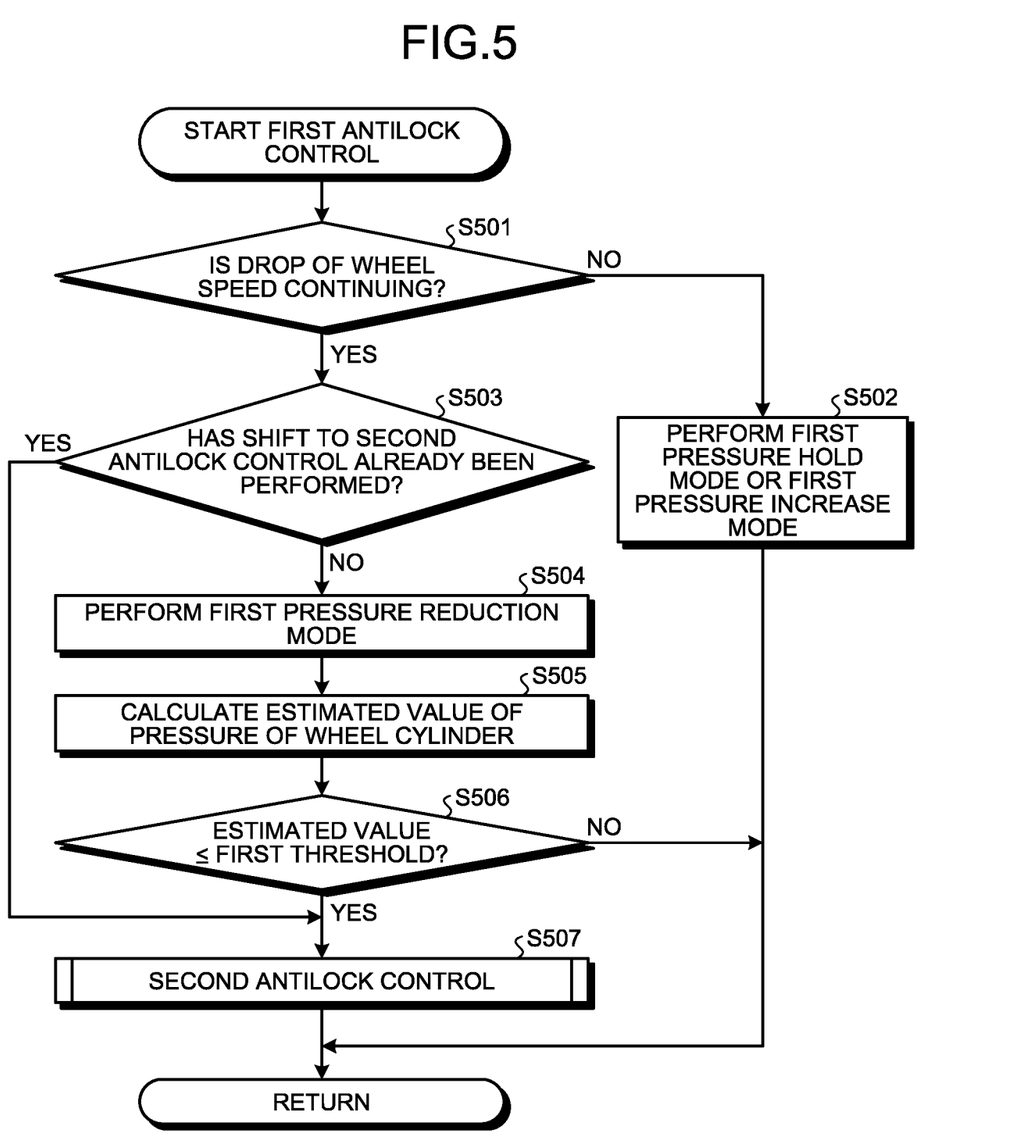
FIG. 5 is an exemplary flowchart illustrating details of first antilock control executed by the brake control apparatus according to the embodiment.

FIG. 5 is an exemplary flowchart illustrating details of the first antilock control executed by the brake control apparatus 200 according to the embodiment.

In the procedure illustrated in FIG. 5, first, at S501, the brake control apparatus 200 determines whether a drop of the wheel speed is continuing. This determination process at S501 is performed on the basis of information on the various kinds of sensors acquired by the acquirer 202.

If it is determined that the drop of the wheel speed is not continuing at S501, there is no need to reduce the pressure of the wheel cylinder 38. Consequently, in this case, the process advances to S502, and at S502, the brake control apparatus 200 performs the first pressure hold mode or the first pressure increase mode as described above. The process then ends.

In contrast, if it is determined that the drop of the wheel speed is continuing at S501, the process advances to S503. At S503, the brake control apparatus 200 determines whether a shift to the second antilock control has already been performed. As described above, the second antilock control is control for inhibiting the lock of the wheel 2 while maintaining a state in which at least the unproductive fluid amount is ensured in the wheel cylinder 38.

If it is determined that the shift to the second antilock control has already been performed at S503, the process advances to S507 described below, and the second antilock control is continuously executed. However, if it is determined that the shift to the second antilock control has not been performed yet at S503, the process advances to S504.

At S504, the brake control apparatus 200 performs the first pressure reduction mode as described above to reduce the pressure of the wheel cylinder 38.

At S505, the brake control apparatus 200 calculates an estimated value of the pressure of the wheel cylinder 38. This estimated value can be calculated on the basis of the output values of the various kinds of sensors acquired by the acquirer 202.

At S506, the brake control apparatus 200 determines whether the estimated value calculated at S505 has become a certain threshold (the first threshold as described above) or less, that is, whether the pressure of the wheel cylinder 38 is about to become zero owing to a long-period pressure reduction.

If it is determined that the estimated value is still larger than the first threshold at S506, the process ends. However, if it is determined that the estimated value has become the first threshold or less at S506, the process advances to S507.

At S507, the brake control apparatus 200 executes the second antilock control including a procedure described below. The process then ends.

Figure 6:
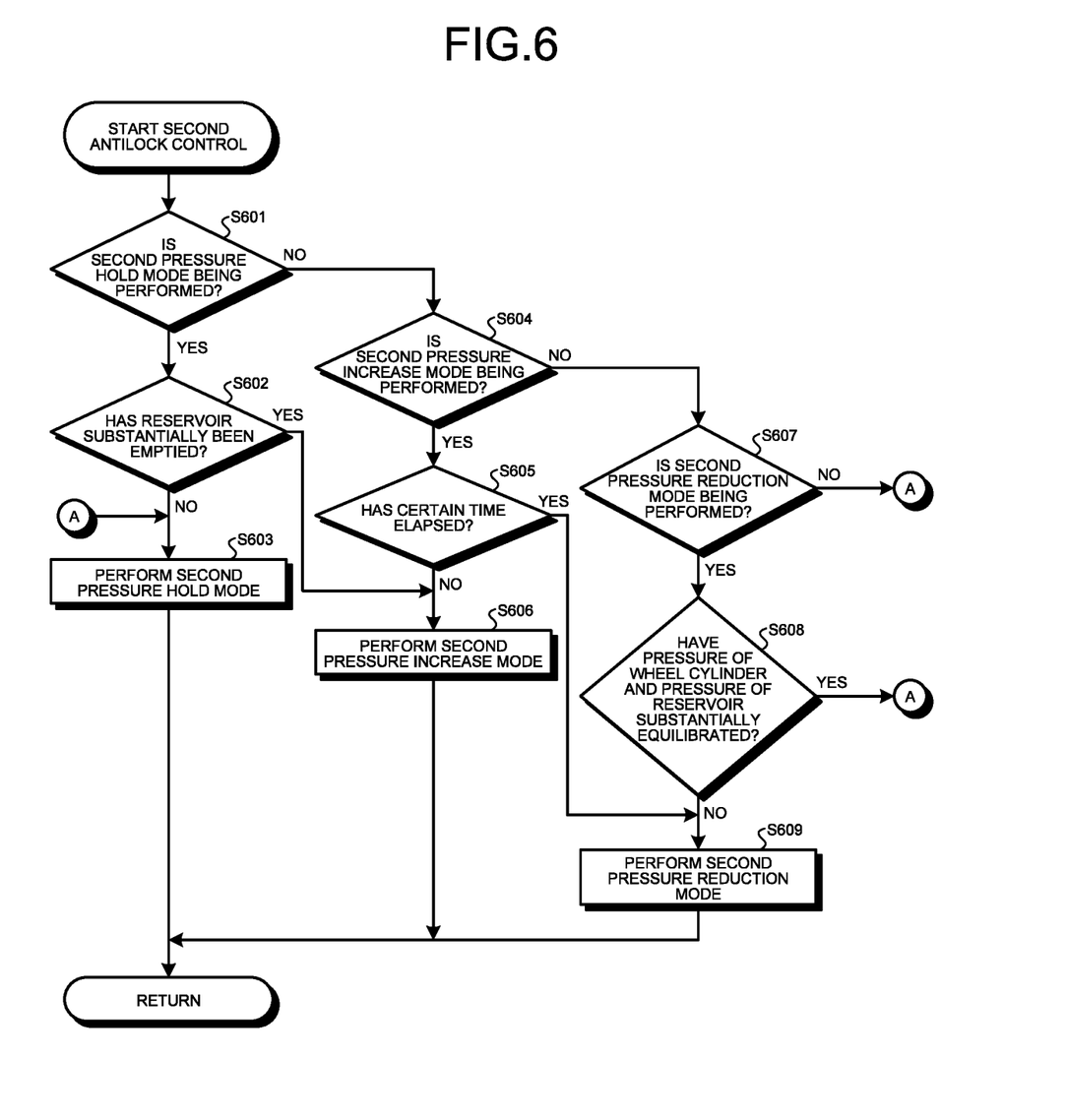
FIG. 6 is an exemplary flowchart illustrating details of the second antilock control executed by the brake control apparatus according to the embodiment.

FIG. 6 is an exemplary flowchart illustrating details of the second antilock control executed by the brake control apparatus 200 according to the embodiment.

In the procedure illustrated in FIG. 6, first, at S601, the brake control apparatus 200 determines whether the second pressure hold mode is being performed. As described above, the second pressure hold mode is a mode of holding the pressure of the wheel cylinder 38 while pumping up the brake fluid from the reservoir 41 with the pump 39 by closing the solenoid valve 36 provided between the wheel cylinder 38 and the reservoir 41 and closing the solenoid valve 35 provided on the side opposite the solenoid valve 36 relative to the wheel cylinder 38 with the pump motor 40 operated.

If it is determined that the second pressure hold mode is already being performed at S601, the process advances to S602. At S602, the brake control apparatus 200 determines whether the reservoir 41 has substantially been emptied by the pumping up of the brake fluid in the second pressure hold mode.

If it is determined that the reservoir 41 has substantially been emptied at S602, the process advances to S606 described below, in which a shift from the second pressure hold mode to the second pressure increase mode is performed. However, if it is determined that the reservoir 41 has not substantially been emptied yet at S602, the process advances to S603.

At S603, the brake control apparatus 200 performs the second pressure hold mode. In other words, at S603, the brake control apparatus 200, if the second pressure hold mode has already been performed, continuously performs the second pressure hold mode and, if another mode (the second pressure increase mode or the second pressure reduction mode) is being performed, performs a shift from the other mode to the second pressure hold mode. The process then ends.

If it is determined that the second pressure hold mode is not being performed at S601, the process advances to S604.

At S604, the brake control apparatus 200 determines whether the second pressure increase mode is being performed. As described above, the second pressure increase mode is a mode of gradually increasing the pressure of the wheel cylinder 38 while causing the brake fluid to flow into the wheel cylinder 38 by closing the solenoid valve 36 provided between the wheel cylinder 38 and the reservoir 41 and opening the solenoid valve 35 provided on the side opposite the solenoid valve 36 relative to the wheel cylinder 38 with the pump motor 40 stopped.

If it is determined that the second pressure increase mode is being performed at S604, the process advances to S605. At S605, the brake control apparatus 200 determines whether a certain time has elapsed from the start of the second pressure increase mode, that is, whether the pressure of the wheel cylinder 38 has been increased by the amount determined in advance.

If it is determined that the certain time has elapsed from the start of the second pressure increase mode at S605, the process advances to S609 described below, in which a shift from the second pressure increase mode to the second pressure reduction mode is performed. However, if it is determined that the certain time has not elapsed yet from the start of the second pressure increase mode at S605, the process advances to S606.

At S606, the brake control apparatus 200 performs the second pressure increase mode. In other words, at S606, the brake control apparatus 200, if the second pressure increase mode is already being performed, continuously performs the second pressure increase mode and, if another mode (the second pressure hold mode or the second pressure reduction mode) is being performed, performs a shift from the other mode to the second pressure increase mode. The process then ends.

If it is determined that the second pressure increase mode is not being performed at S604, the process advances to S607.

At S607, the brake control apparatus 200 determines whether the second pressure reduction mode is being performed. As described above, the second pressure reduction mode is a mode of gradually reducing the pressure of the wheel cylinder 38 while substantially equilibrating the pressure of the wheel cylinder 38 and the pressure of the reservoir 41 at the certain pressure, which is larger than zero, or larger by opening the solenoid valve 36 provided between the wheel cylinder 38 and the reservoir 41 and closing the solenoid valve 35 provided on the side opposite the solenoid valve 36 relative to the wheel cylinder 38 with the pump motor 40 stopped.

If it is determined that the second pressure reduction mode is being performed at S607, the process advances to S608. At S608, the brake control apparatus 200 determines whether the pressure of the wheel cylinder 38 and the pressure of the reservoir 41 have substantially equilibrated.

If it is determined that the pressure of the wheel cylinder 38 and the pressure of the reservoir 41 have substantially equilibrated at S608, the process advances to S603 described above, and a shift from the second pressure reduction mode to the second pressure hold mode is performed. However, if it is determined that the pressure of the wheel cylinder 38 and the pressure of the reservoir 41 have not substantially equilibrated yet at S608, the process advances to S609.

At S609, the brake control apparatus 200 performs the second pressure reduction mode. In other words, at S609, the brake control apparatus 200, if the second pressure reduction mode is already being performed, continuously performs the second pressure reduction mode and, if another mode (the second pressure hold mode or the second pressure increase mode) is being performed, performs a shift from the other mode to the second pressure reduction mode. The process then ends.

If it is determined that the second pressure reduction mode is not being performed at S607, it can be determined that the brake control apparatus 200 is in a state in which none of the second pressure hold mode, the second pressure increase mode, and the pressure reduction mode is being performed yet, that is, a state immediately after the shift from the first antilock control to the second antilock control. Consequently, in this case, the process advances to S603 described above, in which the second pressure hold mode as the first mode performed immediately after the shift from the first antilock control to the second antilock control is performed. The process then ends.

With the foregoing configuration and process, in the embodiment, control in accordance with a timing chart described below, for example, is performed during vehicle braking.

Figure 7:
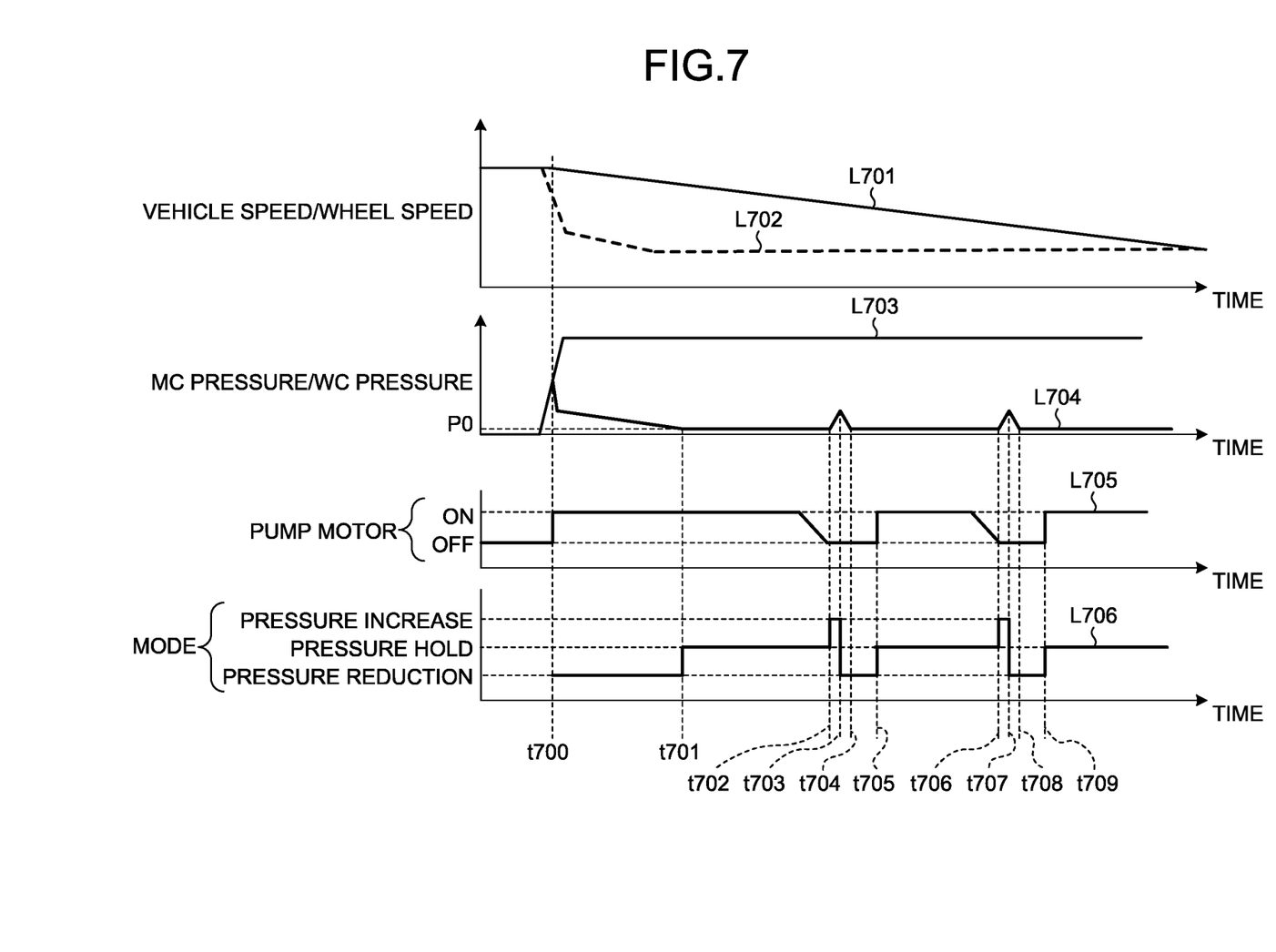
FIG. 7 is an exemplary timing chart illustrating an example of temporal changes in various kinds of parameters during vehicle braking performed by the brake control apparatus according to the embodiment.

FIG. 7 is an exemplary timing chart illustrating an example of temporal changes in various kinds of parameters during vehicle braking performed by the brake control apparatus 200 according to the embodiment.

In FIG. 7, L701 represents a temporal change in the actual vehicle speed, and L702 represents a temporal change in the wheel speed. L703 represents a temporal change in the pressure of the master cylinder 32a (an MC pressure), and L704 represents a temporal change in the pressure of the wheel cylinder 38 (a WC pressure). L705 represents the driving state (ON/OFF) of the pump motor 40, and L706 represents a mode (pressure increase, hold, or reduction) performed by the controller 201 in the antilock control (the first and second antilock control).

In the example illustrated in FIG. 7, both the pressures of the master cylinder 32a and the wheel cylinder 38 start to suddenly increase (refer to L703 and L704) by a sudden braking operation or the like, and at subsequent timing t700, the discrepancy between the wheel speed and the actual vehicle speed exceeds a certain threshold (refer to L701 and L702).

Subsequently, at timing t700, the first pressure reduction mode of the first antilock control for inhibiting the lock of the wheel 2 with the pump motor 40 operated at all times starts (refer to L705 and L706). After timing t700, the pressure of the wheel cylinder 38 reduces along with the performance of the first pressure reduction mode, and at timing t701, the pressure of the wheel cylinder 38 reduces to P0 as the first threshold as described above (refer to L704).

As described above, when the pressure of the wheel cylinder 38 becomes the first threshold P0 or less, the shift from the first antilock control to the second antilock control is performed. Consequently, in the example illustrated in FIG. 7, at timing t701, a shift from the first pressure reduction mode of the first antilock control to the second pressure hold mode of the second antilock control is performed (refer to L706). As described above, in the second pressure hold mode, the pump motor 40 continuously remains operated (refer to L705).

In the example illustrated in FIG. 7, at timing t702, the reservoir 41 is supposed to be substantially emptied. Consequently, in the example illustrated in FIG. 7, at timing t702, the pump motor 40 stops (refer to L705), a shift from the second pressure hold mode to the second pressure increase mode is performed (refer to L706), and the pressure of the wheel cylinder 38 starts to increase (refer to L704).

As described above, the execution time of the second pressure increase mode is determined in advance, and the shift from the second pressure increase mode to the second pressure reduction mode is performed when the execution time elapses. Consequently, in the example illustrated in FIG. 7, at timing t703 which is a certain time after timing t702, the shift from the second pressure increase mode to the second pressure reduction mode is performed (refer to L706), and the pressure of the wheel cylinder 38 starts to reduce. In the second pressure reduction mode, the pump motor 40 remains stopped continuously after the second pressure increase mode (refer to L705).

In the example illustrated in FIG. 7, at timing t704, the pressure of the wheel cylinder 38 again reduces to the first threshold P0 in accordance with the second pressure reduction mode (refer to L704), and toward subsequent timing t705, the pressure of the wheel cylinder 38 and the pressure of the reservoir 41 are equilibrating.

As described above, the second pressure reduction mode is performed until the pressure of the wheel cylinder 38 and the pressure of the reservoir 41 substantially equilibrate, and the shift from the second pressure reduction mode to the second pressure hold mode is performed when the two substantially equilibrate. Consequently, in the example illustrated in FIG. 7, at timing t705, the shift from the second pressure reduction mode to the second pressure hold mode is performed (refer to L706), and the pump motor 40 again starts to be operated (refer to L705).

The temporal changes in the various kinds of parameters observed at subsequent timing t706 to t709 are substantially similar to the temporal changes in the various kinds of parameters observed at timing t702 to t705 described above, whereby descriptions thereof are omitted. The temporal changes in the various kinds of parameters appearing on the basis of such antilock control (the first and second antilock control) continue until the discrepancy between the wheel speed and the actual vehicle speed becomes smaller, and the lock tendency of the wheel 2 is restored.

As described above, the brake control apparatus 200 according to the embodiment includes the controller 201 and the determinator 203. The controller 201 is configured to control the solenoid valves 35 and 36 for regulating the pressure of the wheel cylinder 38 applied by the brake fluid, and to control the pump motor 40 driving the pump 39 pumping up the brake fluid from the wheel cylinder 38 to the master cylinder 32a via the reservoir 41. The controller 201 is configured to perform the first pressure reduction mode, the first pressure hold mode, and the first pressure increase mode in a switched manner by opening and closing the solenoid valves 35 and 36 with the pump motor 40 operated so that the first antilock control for inhibiting the lock of the wheel 2 during vehicle braking is executed. The first pressure reduction mode is a mode of reducing the pressure of the wheel cylinder 38, the first pressure hold mode is a mode of holding the pressure of the wheel cylinder 38, and the first pressure increase mode is a mode of increasing the pressure of the wheel cylinder 38. The determinator 203 is configured to determine whether the certain condition has been satisfied while the first antilock control is being executed.

The controller 201 is configured to execute the second antilock control including the second pressure reduction mode when it is determined that the certain condition has been satisfied while the first antilock control is being executed. The second pressure reduction mode implements reduce of the pressure of the wheel cylinder 38 while substantially equilibrating the pressure of the wheel cylinder 38 and the pressure of the reservoir 41 at the certain pressure, which is larger than zero, or larger by opening and closing the solenoid valves 35 and 36 so as to cause the brake fluid of the wheel cylinder 38 to flow into the reservoir 41 with the pump motor 40 stopped. With this configuration, the shift from the first antilock control to the second antilock control is performed under the certain condition. Consequently, even when the reduction of the pressure of the wheel cylinder 38 is performed for a long period of time, the pressure of the wheel cylinder 38 does not become zero and is the certain pressure or larger, the certain pressure being larger than zero. Thus, the responsiveness of the pressure increase after the long-period pressure reduction can be inhibited from degrading during execution of the antilock control.

In the embodiment, the second antilock control performs the second pressure hold mode, the second pressure increase mode, and the second pressure reduction mode in a switched manner. The second pressure hold mode is a mode of holding the pressure of the wheel cylinder 38 while pumping up the brake fluid from the reservoir 41 with the pump 39 by closing the solenoid valve (the first solenoid valve) 36 provided between the wheel cylinder 38 and the reservoir 41 and closing the solenoid valve (the second solenoid valve) 35 provided on the side opposite the solenoid valve 36 relative to the wheel cylinder with the pump motor 40 operated. The second pressure increase mode is a mode of increasing the pressure of the wheel cylinder 38 while causing the brake fluid to flow into the wheel cylinder 38 by closing the solenoid valve 36 and opening the solenoid valve 35 with the pump motor 40 stopped. The second pressure reduction mode is a mode of reducing the pressure of the wheel cylinder 38 while substantially equilibrating the pressure of the wheel cylinder 38 and the pressure of the reservoir 41 at the certain pressure or larger by opening the solenoid valve 36 and closing the solenoid valve 35 with the pump motor 40 stopped. With this configuration, by performing appropriate switch between the second pressure hold mode, the second pressure increase mode, and the second pressure reduction mode, the lock of the wheel 2 can be inhibited while maintaining the pressure of the wheel cylinder 38 at least at the certain pressure or larger.

In the embodiment, the second antilock control repeats a cycle including performing the second pressure hold mode when shifted from the first antilock control, shifting to the second pressure increase mode when the reservoir 41 has substantially been emptied in the second pressure hold mode, shifting to the second pressure reduction mode when the second pressure increase mode has been performed for a certain time, and returning to the second pressure hold mode when the pressure of the wheel cylinder 38 and the pressure of the reservoir 41 have substantially equilibrated at the certain pressure or larger in the second pressure reduction mode. With this configuration, the second pressure hold mode, the second pressure increase mode, and the second pressure reduction mode can be switched at appropriate timing.

In the embodiment, the certain pressure is the pressure corresponding to the unproductive fluid amount of the wheel cylinder 38, for example. With this configuration, a state in which at least the unproductive fluid amount is ensured in the wheel cylinder 38 can be maintained while the second antilock control is being executed.

In the embodiment, the certain condition as a condition on which the first antilock control shifts to the second antilock control is that the pressure of the wheel cylinder 38 becomes the certain threshold (the first threshold) or less while the first antilock control is being executed. With this configuration, by monitoring the pressure of the wheel cylinder 38, the shift from the first antilock control to the second antilock control can be performed at appropriate timing before the pressure of the wheel cylinder 38 becomes zero.

In the embodiment, the certain condition may be that the duration of the first pressure hold mode or the first pressure reduction mode becomes the certain threshold (the second threshold) or more. With this configuration, determination of whether the reduction of the pressure of the wheel cylinder 38 has been performed for a long period of time can be performed on the basis of the duration of the first pressure hold mode or the first pressure reduction mode, and the shift from the first antilock control to the second antilock control can be performed at appropriate timing based on a result of the determination.

While certain embodiments have been described, these embodiments have been presented by way of example only and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

EXPLANATIONS OF LETTERS OR NUMERALS 2, 2FL, 2FR, 2RL, 2RL: WHEEL
32a: MASTER CYLINDER
35: SOLENOID VALVE (SECOND SOLENOID VALVE)
36: SOLENOID VALVE (FIRST SOLENOID VALVE)
38, 38FL, 38FR, 38RL, 38RR: WHEEL CYLINDER
39: PUMP
40: PUMP MOTOR (MOTOR)
41: RESERVOIR
200: BRAKE CONTROL APPARATUS
201: CONTROLLER
202: ACQUIRER
203: DETERMINATOR

What is claimed is:

1. A brake control apparatus comprising:
a controller configured to control a solenoid valve and a motor, the solenoid valve regulating a pressure of a wheel cylinder given by brake fluid, the motor driving a pump pumping up the brake fluid from the wheel cylinder to a master cylinder, and a reservoir temporarily storing therein brake fluid flowing out of the wheel cylinder, the controller being configured to perform a first pressure reduction mode, a first pressure hold mode and a first pressure increase mode in a switched manner by opening and closing the solenoid valve with the motor operated so that first antilock control for inhibiting lock of a wheel during vehicle braking is executed, the first pressure reduction mode reducing the pressure of the wheel cylinder, the first pressure hold mode holding the pressure of the wheel cylinder, the first pressure increase mode increasing the pressure of the wheel cylinder; and
a determinator configured to determine whether a certain condition has been satisfied while the first antilock control is being executed, wherein
when it is determined that the certain condition has been satisfied while the first antilock control is being executed, the controller executes a second antilock control by opening and closing the solenoid valve with the motor stopped so that the brake fluid of the wheel cylinder is caused to flow into the reservoir, the second antilock control including a second pressure reduction mode, the second pressure reduction mode reducing the pressure of the wheel cylinder while substantially equilibrating the pressure of the wheel cylinder and a pressure of the reservoir at a certain pressure or larger, the certain pressure being larger than zero.

2. The brake control apparatus according to claim 1, wherein
the second antilock control performs a second pressure hold node, a second pressure increase mode, and the second pressure reduction mode in a switched manner, the second pressure hold mode holding the pressure of the wheel cylinder while pumping up the brake fluid from the reservoir with the pump by closing a first solenoid valve serving as the solenoid valve provided between the wheel cylinder and the reservoir and closing a second solenoid valve serving as the solenoid valve provided between the master cylinder and the wheel cylinder with the motor operated, the second pressure increase mode increasing the pressure of the wheel cylinder while causing the brake fluid to flow into the wheel cylinder by closing the first solenoid valve and opening the second solenoid valve with the motor stopped, the second pressure reduction mode reducing the pressure of the wheel cylinder while substantially equilibrating the pressure of the wheel cylinder and the pressure of the reservoir at the certain pressure or larger by opening the first solenoid valve and closing the second solenoid valve with the motor stopped.

3. The brake control apparatus according to claim 2, wherein
the second antilock control repeats a cycle including performing the second pressure hold mode when shifted from the first antilock control, shifting to the second pressure increase mode when the reservoir has substantially been emptied in the second pressure hold mode, shifting to the second pressure reduction mode when the second pressure increase mode has been performed for a certain time, and returning to the second pressure hold node when the pressure of the wheel cylinder and the pressure of the reservoir have substantially equilibrated at the certain pressure or larger in the second pressure reduction mode.

4. The brake control apparatus according to claim 1, wherein
the certain condition is that the pressure of the wheel cylinder becomes a first threshold or less while the first antilock control is being executed.

5. The brake control apparatus according to claim 1, wherein
the certain condition is that a duration of the first pressure hold mode or the first pressure reduction mode becomes a second threshold or more.

6. The brake control apparatus according to claim 1, wherein
the certain pressure is a pressure corresponding to an unproductive fluid amount, which is a fluid amount by which the pressure of the wheel cylinder does not substantially increase.

* * * * *